(12) United States Patent
Kawamura et al.

(10) Patent No.: US 11,634,021 B2
(45) Date of Patent: Apr. 25, 2023

(54) POWER DEVICE FOR VEHICLES

(71) Applicant: NTN CORPORATION, Osaka (JP)

(72) Inventors: Mitsuo Kawamura, Iwata (JP);
Kentaro Nishikawa, Iwata (JP); Yuuji Yada, Iwata (JP); Yasuyuki Fujita, Iwata (JP); Hiroki Yabuta, Iwata (JP)

(73) Assignee: NTN CORPORATION, Osaka (JP)

( * ) Notice: Subject to any disclaimer, the term of this patent is extended or adjusted under 35 U.S.C. 154(b) by 374 days.

(21) Appl. No.: 16/850,604

(22) Filed: Apr. 16, 2020

(65) Prior Publication Data

US 2020/0276896 A1 Sep. 3, 2020

Related U.S. Application Data

(63) Continuation of application No. PCT/JP2018/038533, filed on Oct. 16, 2018.

(30) Foreign Application Priority Data

Oct. 17, 2017 (JP) .............................. JP2017-200779

(51) Int. Cl.
*B60K 6/26* (2007.10)
*B60K 7/00* (2006.01)
*H02K 7/08* (2006.01)

(52) U.S. Cl.
CPC .............. *B60K 6/26* (2013.01); *B60K 7/0007* (2013.01); *B60K 2006/264* (2013.01); *H02K 7/08* (2013.01)

(58) Field of Classification Search
CPC .. B60K 6/26; B60K 7/0007; B60K 2006/264; H02K 7/08
See application file for complete search history.

(56) References Cited

U.S. PATENT DOCUMENTS

| 7,717,203 B2 | 5/2010 | Yoshino et al. |
| 2004/0069576 A1* | 4/2004 | Torii ....................... F16D 65/12 188/18 A |
| 2005/0035676 A1 | 2/2005 | Rahman et al. |
| 2006/0158050 A1* | 7/2006 | Maeda ..................... H02K 7/14 310/58 |

(Continued)

FOREIGN PATENT DOCUMENTS

| CN | 201745428 U | 2/2011 |
| EP | 3 330 099 A1 | 6/2018 |

(Continued)

OTHER PUBLICATIONS

English Translation of JP 2003 348795 A (Year: 2003).*

(Continued)

*Primary Examiner* — Sean Gugger

(57) ABSTRACT

The power device for a vehicle includes: a wheel bearing including a stationary ring and a rotary ring having a hub flange, the rotary ring being rotatably supported by the stationary ring via rolling element, the hub flange being configured to be attached with a wheel of a vehicle and a brake rotor; and a generator including a stator attached to the stationary ring of the wheel bearing and a rotor attached to the rotary ring of the wheel bearing, wherein the rotor includes a soft magnetic material part, magnets, and a resin material part that is integrally molded with the soft magnetic material part and the magnets.

8 Claims, 11 Drawing Sheets

(56) References Cited

U.S. PATENT DOCUMENTS

| | | |
|---|---|---|
| 2008/0070736 A1 | 3/2008 | Yoshino et al. |
| 2009/0064727 A1 | 3/2009 | Choi et al. |
| 2013/0293036 A1* | 11/2013 | Yamamoto ............... H02K 7/08 310/43 |
| 2016/0329757 A1 | 11/2016 | Li et al. |
| 2016/0329762 A1 | 11/2016 | Li et al. |
| 2016/0329789 A1 | 11/2016 | Li et al. |
| 2016/0329790 A1 | 11/2016 | Li et al. |
| 2016/0329791 A1 | 11/2016 | Li et al. |
| 2016/0329792 A1 | 11/2016 | Li et al. |
| 2016/0329793 A1 | 11/2016 | Li et al. |
| 2016/0329794 A1 | 11/2016 | Li et al. |
| 2017/0110933 A1 | 4/2017 | Michel |
| 2020/0198456 A1 | 6/2020 | Kawamura et al. |

FOREIGN PATENT DOCUMENTS

| | | |
|---|---|---|
| EP | 3680119 A | 7/2020 |
| JP | 2001-148150 A | 5/2001 |
| JP | 2001-204156 | 7/2001 |
| JP | 2003-348795 | 12/2003 |
| JP | 2007-153266 | 6/2007 |
| JP | 2007-162923 | 6/2007 |
| JP | 4694147 | 6/2011 |
| JP | 4724075 | 7/2011 |
| JP | 2014-183627 | 9/2014 |
| JP | 2016-226267 A | 12/2016 |
| JP | 2017-30480 A | 2/2017 |
| WO | WO2007/141841 A | 12/2007 |

OTHER PUBLICATIONS

Extended and Supplementary Search Report dated Jun. 14, 2021 on corresponding European patent application No. 18867797.5.
Notice of Reasons for Refusal for Japanese Patent Application No. 2017-200779 dated Oct. 19, 2021.
International Search Report dated Dec. 25, 2018, in corresponding International Patent Application No. PCT/JP2018/038533.
International Preliminary Report on Patentability dated Apr. 21, 2020, in corresponding International Patent Application No. PCT/JP2018/038533.
Chinese Office Action dated Aug. 29, 2022 in Chinese Patent Application No. 201880067540.8 (6 pages; 6 pages English translation).
Chinese Office Action dated Jan. 9, 2023 in Chinese Patent Application No. 201880067540.8 (4 pages; 7 pages English translation).

* cited by examiner

POWER DEVICE FOR VEHICLES

CROSS REFERENCE TO THE RELATED APPLICATION

This application is a continuation application, under 35 U.S.C. § 111(a), of international application No. PCT/JP2018/038533, filed Oct. 16, 2018, which claims priority to Japanese patent application No. 2017-200779, filed Oct. 17, 2017, the entire disclosures of all of which are herein incorporated by reference as a part of this application.

BACKGROUND OF THE INVENTION

Field of the Invention

The present invention relates to a power device for vehicles that includes a wheel bearing and a generator, such as a motor generator, and is capable of achieving increased power generation or further achieving an increased drive output with a small number of components, without significantly changing the attachment structure of a wheel bearing to a vehicle body.

Description of Related Art

In-wheel motor structure in which a motor is incorporated in a wheel does not require a power unit to be mounted in a vehicle body, though they require an inverter for driving the motor and/or a battery to be mounted in the vehicle body. Thus, the in-wheel motor structure can provide power to the vehicle without occupying a large space in the vehicle body, imparting flexibility to design of the vehicle body (for example, Patent Documents 1, 2). This motor functions as a generator for generating regenerative power during braking. Therefore, the motor is also referred to as a "motor generator" in this specification.

RELATED DOCUMENT

Patent Document

[Patent Document 1] JP Patent No. 4694147
[Patent Document 2] JP Patent No. 4724075

SUMMARY OF THE INVENTION

However, since a motor output is proportional to a volume of a motor, it is necessary to provide, e.g., a large motor or a speed reduction mechanism in order to obtain a large output. For in-wheel motors having a motor of a large volume or a speed reduction mechanism, it is not possible to use the same mount structure for a wheel bearing as a conventional one because it is difficult to accommodate such an in-wheel motor within a wheel body, making it inevitable to change a chassis structure of the vehicle body.

In this regard, description is made with reference to drawings. FIG. 12 to FIG. 14 show a conventional and general fixing structure for a wheel bearing. A wheel bearing 2 includes an inner ring 5 as a hub axle and an outer ring 4 as a stationary ring, the outer ring 4 being fixed to a knuckle 8A by fastening bolts. A brake rotor 12 and a rim (not illustrated) of a wheel are attached to a hub flange 7 of the inner ring 5 in an overlapping manner. Since an in-wheel motor (not illustrated) that can be accommodated within the brake rotor 12 does not have a large enough volume so that sufficient power can be provided to a vehicle body only by such a wheel bearing 2 and the motor, it is necessary to use a speed reduction mechanism so as to increase an output torque or to increase the motor size. Where a larger motor is used, it is difficult to accommodate the motor within a wheel body because of its axial dimension, and it is thus not possible to employ a structure for fastening a knuckle surface and a flange surface by bolts as in the fixing structure for a wheel bearing in the FIG. 12 to FIG. 14, making it inevitable to change a chassis structure of a vehicle body.

In contrast, where an in-wheel motor is mounted as a power-assisted system in a hybrid system which includes a different power mechanism, such as an internal combustion engine, as a main power means, it is not necessary to supply power to the vehicle body only by the in-wheel motor, and it is possible to drive the in-wheel motor and/or perform regenerative braking and charging in accordance with a traveling state of the vehicle and/or a state of the main power means so as to reduce fuel consumption and improve power performance of the vehicle.

In the case where the in-wheel motor is used as a power-assisted system, however, it requires the following and thus poses a challenge:

no need to modify a structure of a peripheral component;
equivalent mountability to that of a conventional wheel bearing;
reduction in the number of components; and
increased output of an output torque within a limited space.

Accordingly, the following structure may be used as a structure that can be installed without significantly changing the chassis structure of the vehicle body as in FIG. 10. The structure includes a motor disposed axially between a hub flange of a wheel bearing and a knuckle surface that is a surface of the wheel bearing for attaching to a vehicle body, and within a radial range inside an outer peripheral part that is a part of a brake rotor against which a brake caliper is pressed. This structure makes it possible to attach the motor to the vehicle body without modifying a suspension part. Additionally, this structure can also provide relatively high output torque and power generation voltage, even though it can be installed in a limited space within a wheel body.

It is, however, still possible to further increase an output in a limited space, and there is still a problem in manufacturability and compactness for rigidly attaching a rotor and/or magnets or a magnetic body thereof to a rotary ring of the wheel bearing.

In order to solve the above problem, an object of the present invention is to provide a vehicle power device that can be equipped with a generator, have a small number of components and achieve high precision and productivity, without significantly changing a chassis structure.

A power device for a vehicle of the present invention includes:

a wheel bearing including a stationary ring and a rotary ring having a hub flange, the rotary ring being rotatably supported by the stationary ring via rolling elements, the hub flange being configured to be attached with a wheel of the vehicle and a brake rotor; and a generator including a stator attached to the stationary ring of the wheel bearing and a rotor attached to the rotary ring of the wheel bearing, wherein the rotor includes a soft magnetic material part, magnets, and a resin material part that integrally fixes the soft magnetic material part and the magnets to the hub flange.

According to this configuration, since it is of a direct drive type in which the rotor of the generator is attached to the rotary ring of the wheel bearing, the vehicle power device as a whole can have a smaller number of components and a simple and space-saving configuration, and it is thus possible to suppress increase in the vehicle weight. In addition, since the rotor includes the soft magnetic material part, the magnets, and the resin material that is integrally molded with the soft magnetic material part and the magnets, it is possible to reduce the number of components, improve processing precision and assembly precision of the rotor, reduce the weight of the rotor, enhance strength for holding the magnets in the rotor, and enhance strength of the entire rotor.

That is, since the soft magnetic material part and the magnets constituting the rotor are integrated by injection molding, e.g., insert molding, of the resin material, the rotor is constituted by the least number of components. Thus, it is possible to use a die in molding, achieving high processing precision. In addition, the rotor casing has a lower weight than that of a casing made of a metal material. Specifically, thanks to the integration of the soft magnetic material and the magnets with the resin material, it is possible to integrate the holding part for the magnets and the structure body and to increase strength for holding the magnets in the rotor. Conventionally, there has been a technique of inserting a ring member on an inner diameter side in order to hold magnets of an SPM, this results in an increased number of components and in deterioration of motor characteristics when a material having low magnetic permeability is used. Such a problem can be solved by integrating the soft magnetic material and the magnets with the resin material.

In the present invention, all or a part of the stator and the rotor of the generator may have a smaller diameter than that of the outer peripheral part of the brake rotor against which a brake caliper is pressed, and may be located within an axial range between the hub flange and an outboard-side surface of a chassis frame component in the vehicle. In the case of this configuration, it is possible to secure a space for installing the generator in a limited space within the brake rotor to compactly accommodate the generator.

In the present invention, the generator may be a motor generator configured to be supplied with power to generate a rotational driving force. In the case where the generator is a motor generator, it is possible to reduce fuel consumption by power assist in a vehicle including a separate driving source for travelling, such as an internal combustion engine and a motor, besides the vehicle power device.

The generator may be of an outer rotor type in which the stator is located on an outer periphery side of the wheel bearing, and the rotor is located on an outer periphery side of the stator. Where the generator is of the outer rotor type, it is possible to increase an area in which the rotor and the stator are opposed, compared with that of the generator of an inner rotor type. This makes it possible to maximize an output in a limited space. Also, where the generator is a motor generator, a large torque can be obtained because a moment is generated at a position away from the center axis of the generator.

In the present invention, the generator may be of a surface permanent magnet type in which the magnets are arranged at an inner diameter part side of the soft magnetic material of the rotor. Since it is necessary to increase an area in which the rotor and the stator are opposed to each other in order to maximize a generated power or an output torque in a limited space, it is preferred to use a generator or a motor generator, such as a permanent magnet synchronous motor of an outer rotor type in which magnets are arranged in an outer rotor, and coils are arranged in an inner stator.

In the present invention, the generator may be of an interior permanent magnet type in which the magnets are arranged in the soft magnetic material of the rotor. Where the generator is of the interior permanent magnet type, the magnets are unlikely fall to the stator side because the magnets are embedded in the rotor. Also, where the generator is of the interior magnet type, rotation is generated thanks to magnetic saliency of parts of the magnetic body between circumferentially adjacent magnets.

In the present invention, the inner ring of the wheel bearing and the rotor may be integrally molded with a resin material to be formed into the resin material part. The integrally molding may be performed by injection molding. By integrally molding the rotor and the inner ring with the resin material so as to fix the rotor to the inner ring, it is possible to fix the rotor to the hub flange at the same time as forming the resin material part of the rotor, eliminating the necessity of fixing by bolts etc. and thus achieving excellent productivity.

In the present invention, the generator may have a power generation voltage lower than 60 V. In the case of this configuration, a vehicle only having an internal combustion engine can be converted to a so-called mild hybrid vehicle by installing an intermediate voltage battery, without significant modifications of the vehicle.

A vehicle of the present invention is equipped with a vehicle power device according to any of the above configurations of the present invention. The vehicle of this configuration provides the same effects and advantages described above for the vehicle power device of the present invention.

Any combination of at least two constructions disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

The present invention will be more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views. In the figures.

DESCRIPTION OF THE EMBODIMENTS

Figure 1:
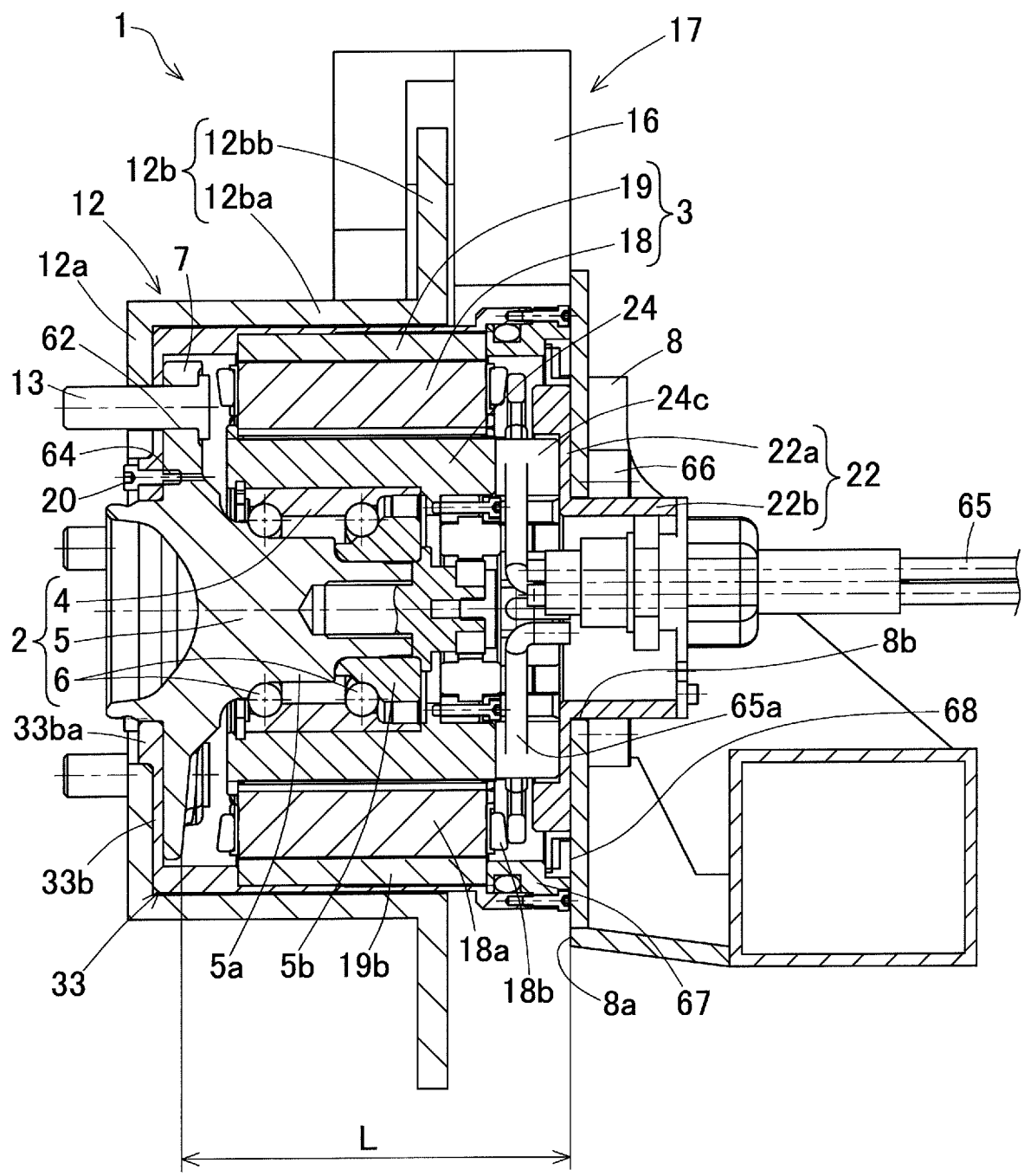
FIG. 1 is a sectional view of a vehicle power device according to an embodiment of the present invention.

Hereinafter, embodiments of the present invention will be described with reference to the drawings. FIG. 1 is a sectional view of a vehicle power device. The vehicle power device 1 includes a wheel bearing 2 incorporated with a motor generator 3 of a direct drive type. The motor generator 3 is a generator that also serves as a motor. The motor generator 3 is disposed, in a radial direction, on an inner diameter side with respect to an outer peripheral part 12b of a brake rotor 12 against which a brake caliper is pressed and, in an axial direction, within an axial range L between a side surface of a hub flange 7 of the wheel bearing 2 and an outboard-side surface 8a of a chassis frame component 8. The chassis frame component 8 is a part of a suspension to which the wheel bearing 2 is mounted and corresponds to a knuckle in this embodiment.

The motor generator 3 includes a stator 18 and a rotor 19. The rotor 19 includes a soft magnetic material part 31, magnets 32 (FIG. 3, FIG. 6 to FIG. 8), and a resin material part 33 in the form of a casing which is integrally molded with the soft magnetic material part 31 and the magnets 32.

Wheel Bearing 2

The wheel bearing 2 includes an outer ring 4 as a stationary ring, double-row rolling elements 6, and an inner ring 5 as a rotary ring. The inner ring 5 includes a hub axle 5a and a partial inner ring 5b fitted to an outer peripheral surface of the hub axle 5a on an inboard side. The hub axle 5a includes a hub flange 7 at a position axially protruding toward an outboard side with respect to the outer ring 4.

The hub flange 7 has a side surface on the outboard side to which a rim (not illustrated) of a wheel, the brake rotor 12, and a bottom part 33b of the resin material part 33 of the rotor 19 are attached by hub bolts 13 in an overlapping manner in the axial direction. The rim has an outer periphery to which a non-illustrated tire is attached. It should be noted that in this specification, the term "outboard side" refers to a side closer to outside in a widthwise direction of a vehicle in a state where the vehicle power device is mounted on the vehicle, and the term "inboard side" refers to a side closer to the center in the widthwise direction of the vehicle.

Brake 17

A brake 17 is a friction brake including a brake rotor 12 of a disk type and a brake caliper 16. The brake rotor 12 includes a plate-like part 12a and an outer peripheral part 12b. The plate-like part 12a is an annular plate-like member that overlaps with the hub flange 7 through a bottom part 33b of the resin material part 33 of the rotor 19. The outer peripheral part 12b extends from the plate-like part 12a toward an outer peripheral side of the outer ring 4. The outer peripheral part 12b includes: a cylindrical portion 12ba that extends from an outer peripheral edge portion of the plate-like part 12a toward the inboard side in a cylindrical manner; and a plate portion 12bb that extends from an inboard-side end of the cylindrical portion 12ba toward an outer diameter side in a plate-like manner.

The brake caliper 16 includes friction pads configured to be pressed against the plate portion 12bb of the brake rotor 12 from both sides. The brake caliper 16 is mounted to the chassis frame component 8, in the form of a knuckle, of the vehicle. The brake caliper 16 may be any of a hydraulic type, a mechanical type, and an electric motor type.

Specific Configuration of Motor Generator 3

The motor generator 3 is an SPM (surface permanent magnet) synchronous motor or an IPM (interior permanent magnet) synchronous motor, and is, in either case, of an outer rotor type in which the rotor 19 is located at an outer peripheral side of the stator 18. As shown in FIG. 3 and FIG. 5 to FIG. 7, the rotor 19 includes the soft magnetic material part 31 and the magnets 32 that are integrally molded with in the resin material part 33. The soft magnetic material part 31 is made of a soft magnetic material, such as an electromagnetic steel sheet formed of layered thin plates and an amorphous alloy, and is integrally insert-molded with a resin material to be formed into the resin material part 33 by injection molding, with the magnets 32 incorporated therein. For the respective cases where the motor generator 3 is of an SPM type and is of an IPM type, specific configurations and advantages will be described later.

The resin material part 33 is a member that also serves as a casing for the motor generator 3 and includes a cylindrical part 33a and a bottom part 33b in a shape of an inner flange which extends from an end of the cylindrical part 33a toward the inner diameter side. In the resin material part 33 that also serves as a casing, the bottom part 33b is fastened with the hub flange 7 of the inner ring 5 of the wheel bearing 2 through bolts 20 (see FIG. 1) and integrally rotates with the inner ring 5. The bolts 20 are inserted through bolt insertion holes 61 in a thick portion 33ba provided to an inner peripheral edge of the bottom part 33b and are screwed into screw holes 64 of the hub flange 7. The bottom part 33b of the resin material part 33 is also provided with hub bolt insertion holes 62. The cylindrical part 33a has an inner peripheral surface that sequentially forms a small diameter portion, an intermediate diameter portion and a large diameter portion from the outboard side to the inboard side, and the soft magnetic material part 31 is located in the intermediate diameter portion. The large diameter portion is fitted with a ring-shaped component 67 and is provided with a sealing 68 between the large diameter portion and a spacer 22 on a stationary side, which will be described later.

In FIG. 1, the stator 18 includes a core 18a and coils 18b wound around respective teeth provided in a circumferential direction of the core 18a. The coils 18b are connected with wiring 65. The stator 18 is attached to an outer peripheral surface of the outer ring 4 through an annular holding member 24. The inner peripheral surface of the stator 18 and the outer peripheral surface of the outer ring 4 are fixed to the holding member 24, and an end portion of the holding member 24 is in contact with the outboard-side surface 8a of the chassis frame component 8 in the form of the knuckle and is fixed to the chassis frame component 8. The stator 18 is fixed to, e.g., the holding member 24 with respect to a rotation direction and the radial direction by press-fitting or bolt fastening. Further, the holding member 24 is fixed to the outer peripheral surface of the outer ring 4 by press-fitting or bolt fastening.

Figure 5:
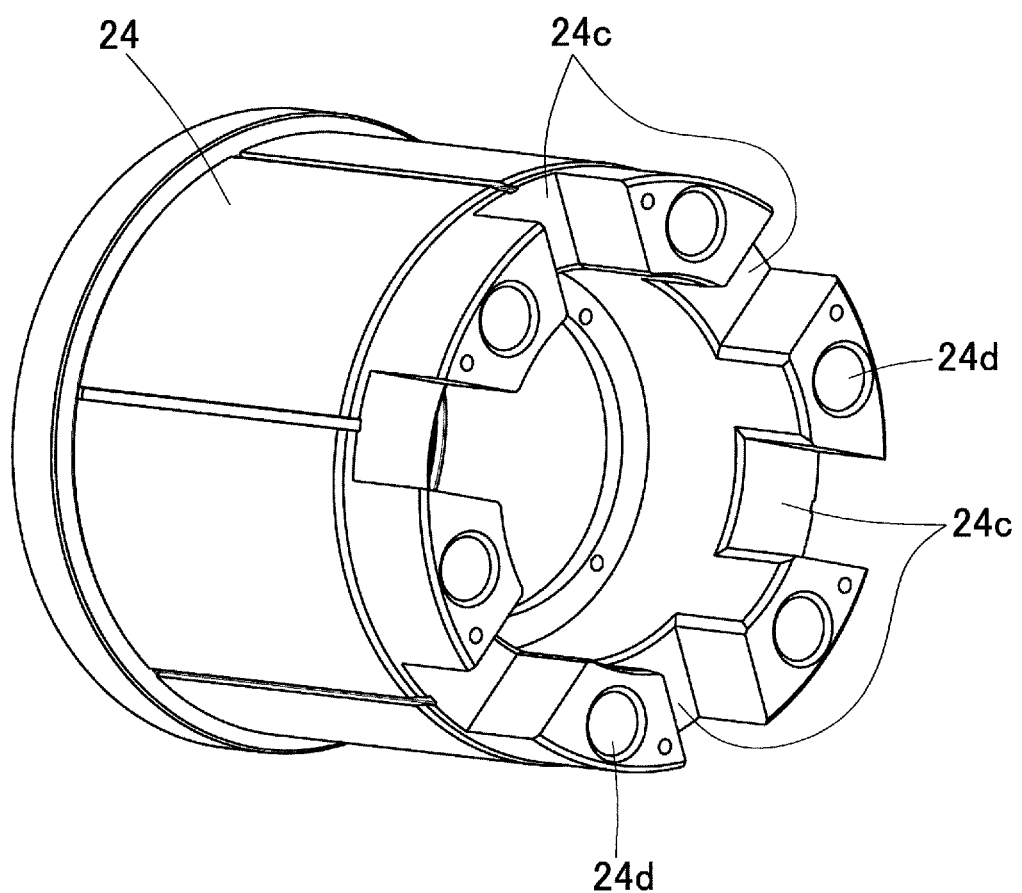
FIG. 5 is a perspective view of a holding member of the vehicle power device.

As shown in FIG. 5, the holding member 24 has an end portion on the inboard side (the side of the chassis frame component 8) which is provided with a plurality (six, in this example) of communication holes 24c, arranged in the circumferential direction, through which connection wires of the coils 18b (see FIG. 1) are passed from the outer diameter side to the inner diameter side of the holding member 24. For example, the plurality of communication holes 24c are defined by providing notches on an end face of the holding member 24 on the inboard side at equal intervals in the circumferential direction. It should be noted that the plurality of communication holes 24c do not necessarily be provided at equal intervals in the circumferential direction and may be defined as communication holes for inserting radial leading portions 65a (FIG. 1) of the wiring 65 that generally has three phases of U phase, V phase, and W phase. The holding member 24 is formed with a plurality of internal threads 24d extending in the axial direction at equal intervals in the circumferential direction.

Figure 2:
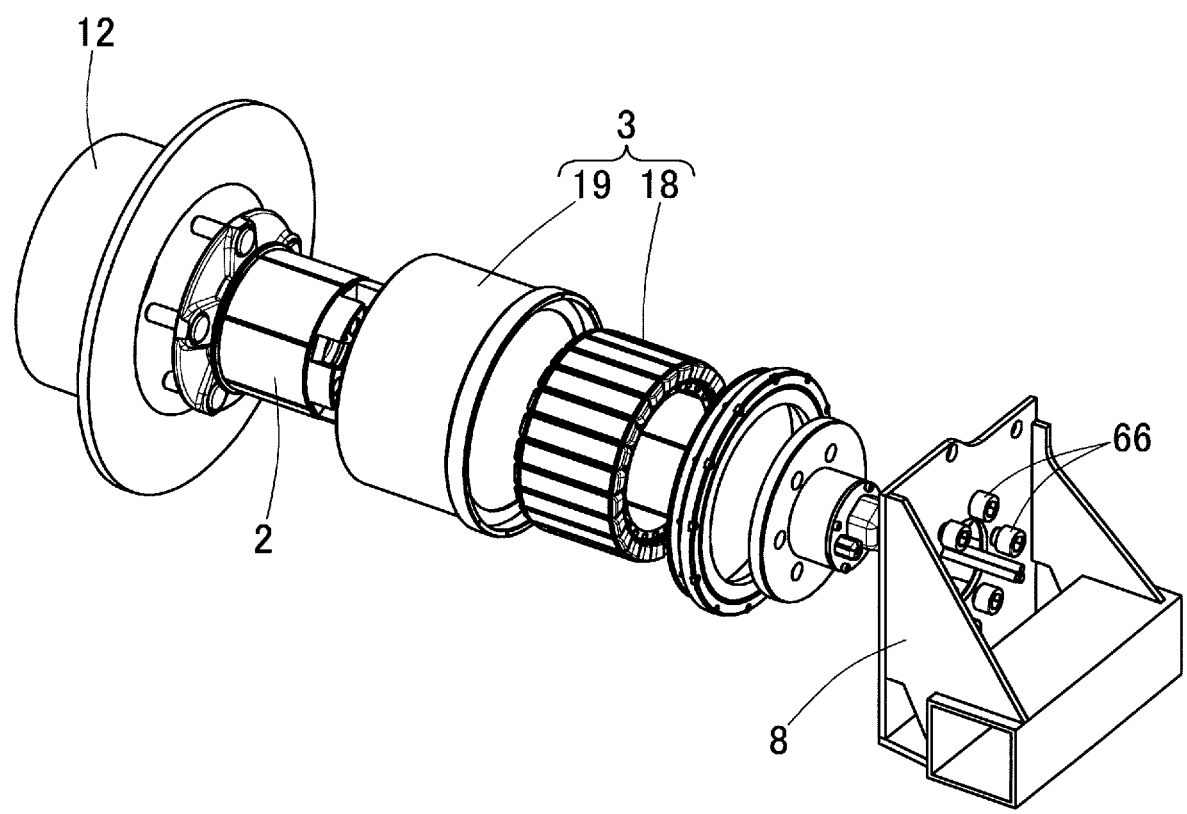
FIG. 2 is an exploded perspective view of the vehicle power device.
Figure 3:
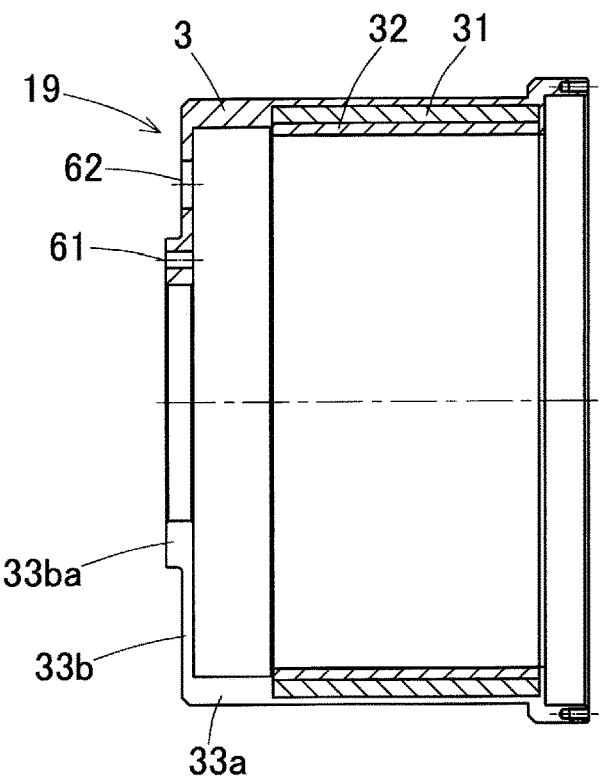
FIG. 3 is a sectional view of a rotor of a generator of the vehicle power device.
Figure 4:
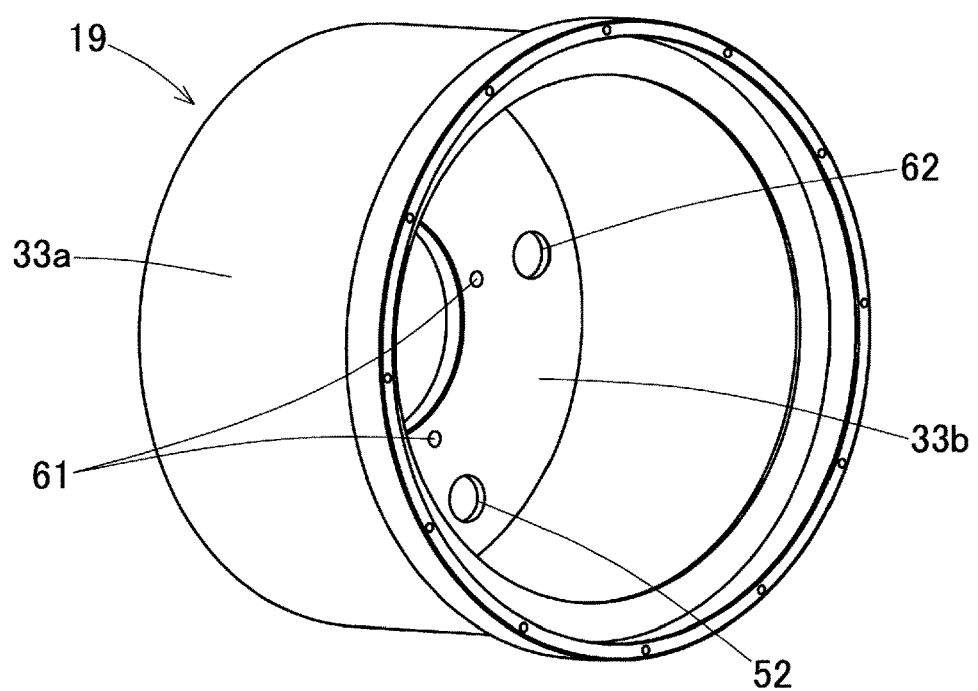
FIG. 4 is a perspective view of the rotor.

As shown in FIG. 1 and FIG. 2, the holding member 24 and the chassis frame component 8 are fastened with each other through a plurality of bolts 66. These bolts 66 are inserted from the inboard side into bolt insertion holes (not illustrated) provided in the chassis frame component 8 and are screwed into the internal threads 24d of the holding member 24.

As shown in FIG. 1, a cover radial wall part 22a of a unit cover 22 is interposed between the inboard-side end face of the holding member 24 and the outboard-side surface 8b of the chassis frame component 8. The chassis frame component 8 is formed with a through-hole 8b that allows the outer peripheral surface of the cylinder part 22b of the unit cover 22 to be inserted, and insertion holes (not illustrated) for inserting the plurality of bolts 66 are defined around the through-hole 8b so as to be in phase with the respective internal threads 24d. The unit cover 22 is fastened and fixed to the chassis frame component 8 along with the holding member 24 by the bolts 66.

According to the vehicle power device of this configuration, since it is of a direct drive type in which the rotor 19 of the motor generator 3 is attached to the inner ring 4 that is the rotary ring of the wheel bearing 2, the vehicle power device 1 as a whole can have a smaller number of components and a simple and space-saving configuration, and it is thus possible to suppress increase in the weight of the vehicle equipped with the vehicle power device 1. In addition, since all or a part of the stator 18 and the rotor 19 has a smaller diameter than that of the outer peripheral part 12b of the brake rotor 12, and the entirety of the motor generator 3, excluding its mounting part to the hub flange 7, is located within the axial range L between the hub flange 7 and the outboard-side surface 8a of the chassis frame component 8, it is possible to secure a space for installing the motor generator 3 in a limited space within the outer peripheral part 12b of the brake rotor 12 to compactly accommodate the motor generator 3.

Further, since the rotor 19 includes the soft magnetic material part 31, the magnets 32, and the resin material part 33 that is integrally molded with the soft magnetic material part 31 and the magnets 32, it is possible to reduce the number of components, improve processing precision and assembly precision of the rotor 19, reduce the weight of the rotor 19, enhance strength for holding the magnets 32 in the rotor 19, and enhance strength of the entire rotor 19.

That is, since the soft magnetic material part 31 and the magnets 32 constituting the rotor 19 are integrated by injection molding, such as insert molding, of the resin material, the rotor 19 is constituted by the least number of components. In such a case, it is possible to use a die in molding, achieving high processing precision. In addition, since the resin material part 33 that also serves as a casing for the rotor 19 is formed of a resin material, the rotor casing has a lower weight than that of a casing made of a metal material. Conventionally, there has been a technique of inserting a ring member on an inner diameter side in order to hold magnets of an SPM, this results in an increased number of components and in deterioration of motor characteristics when a material having low magnetic permeability is used. Such a problem can be solved by integrating the soft magnetic material 31 and the magnets 32 into the resin material part 33.

Since it is necessary to increase an area in which the rotor 19 and the stator 18 are opposed in order to maximize an output torque or power generation in a limited space, it is preferred to use a permanent magnet synchronous motor of an outer rotor type in which the magnets 32 are arranged in the rotor 19 on the outer side, and the coils 18b are arranged in the stator 18 on the inner side. Since, in general, motor generators accompanied with acceleration and deceleration suppress iron loss occurring with change in magnetic flux, they includes a core of a stator and a soft magnetic body part of a rotor that are formed of soft magnetic materials, such as an electromagnetic steel sheet, a powder magnetic core, and an amorphous alloy. The motor generator 3 of the vehicle power device 1 includes the soft magnetic body part 31 of the rotor 19 formed of thin plates of an appropriate soft magnetic material (a silicon steel sheet or an amorphous alloy) so as to reduce eddy current loss in the rotor 19 and to enhance motor characteristics. It is, however, difficult to form the rotor 19 only of a soft magnetic material. Since soft magnetic materials have low strength as a structure body and are formed of layered thin plates as described above, there are a problem that the layered sheets are peeled off. In addition, since both of the soft magnetic materials and the magnets are liable to rust, and their performance is deteriorated due to oxidation, it is necessary to perform surface treatment or provide a sealing structure.

Next, for the respective cases where the motor generator 3 is of an SPM type and is of an IPM type, specific configurations and advantages will be described with reference to FIG. 6 and FIG. 7.

Figure 6:
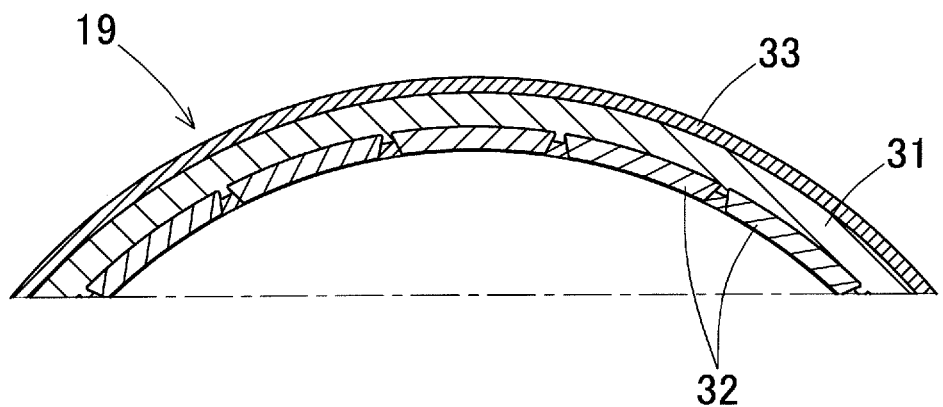
FIG. 6 is a partial sectional view of the rotor.

FIG. 6 shows an exemplary configuration of the rotor 19 of the motor generator 3 of an SPM type. FIG. 6 is an enlarged view that shows only the rotor part. The motor generator 3 is fixed to a surface of the rotor 19 on the stator side in such a way that a plurality of the magnets 32 are exposed and are arranged in the circumferential direction.

When current is applied to the coils 18b on the stator 18 side during the operation of the motor generator 3, the core 18a of the stator 18 is magnetized to attract the magnets 32 of the rotor 19. In the SPM motor, the magnets have to be fixed by, e.g., bonding, fitting, or inserting a separate component in order to prevent the magnets from being separated during the motor operation. In this embodiment, the resin material part 33 is formed such that the resin material surrounds the peripheries of the rotor 19 and the magnets 32 thereof. This makes it possible to prevent the magnets 32 from being separated without fixing them by bonding or the like. Also, use of the resin material to form the resin material part imparts high magnetic permeability, and thus magnetic flux does not flow, causing no change in the characteristics of the motor generator 3. If the magnets 32 are fixed by using a material having low magnetic permeability, such as iron, the flow of magnetic flux changes, causing a significant deterioration in the characteristics of the motor generator 3. There is a motor gap between the rotor 19 and the stator 18. The smaller the motor gap is, the better the motor characteristics (characteristics of the motor generator 3) are. Where the motor gap is small, however, the rotor 19 and the stator 18 may come into contact with each other due to looseness of the wheel bearing 2 and/or vibration or impact from outside. In this embodiment, the resin material part 33 is formed on the inner diameter side of the rotor 19 so that the possibility of damage in cases where the rotor 19 and the stator 18 come into contact with each other can be reduced in comparison with the conventional configuration.

Figure 7:
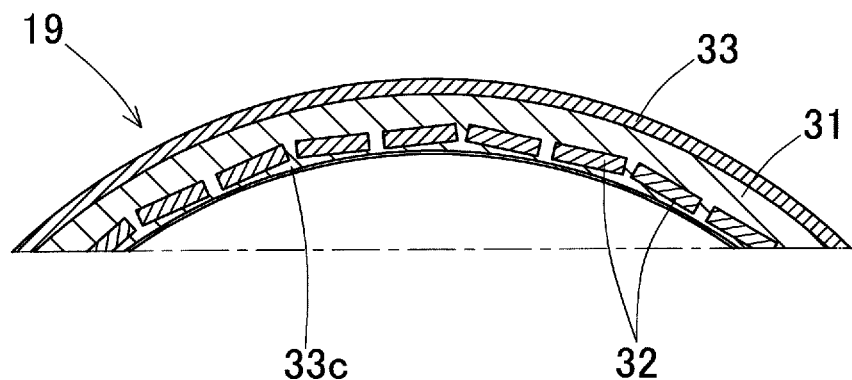
FIG. 7 is a partial sectional view of a variant of the rotor.
Figure 8:
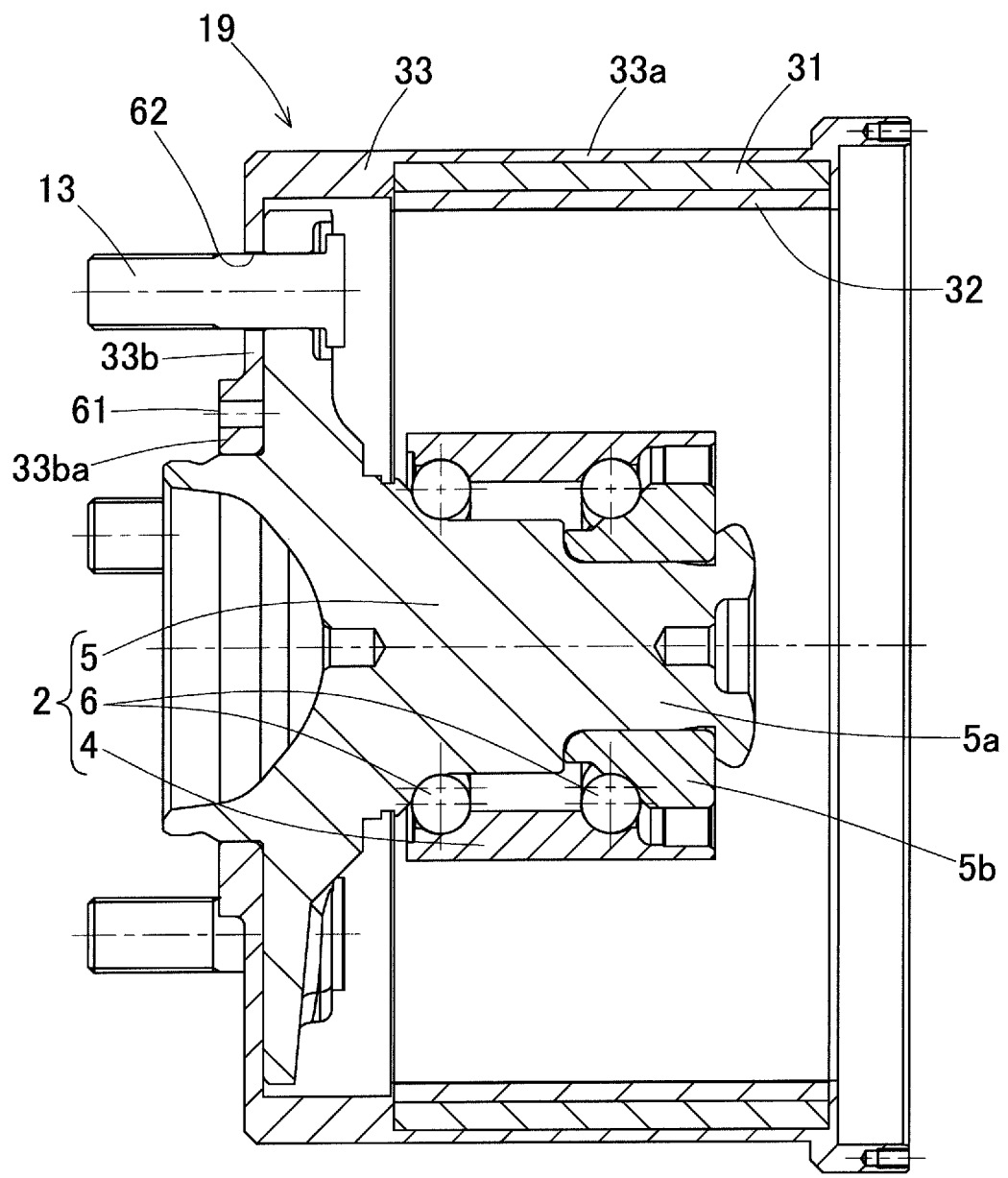
FIG. 8 is a sectional view illustrating an assembled state of the rotor and a wheel bearing.

FIG. 7 shows an exemplary configuration in an IPM (interior permanent magnet) motor. In the IPM motor, in general, the magnets are unlikely to fall to the stator side because the magnets are embedded in the rotor. Depending on the magnet arrangement, however, there may be a thin part formed on the inner diameter side of the rotor, and deformation or breakage of the rotor may be caused due to the attraction force of the magnets. In this embodiment, a layer 33c made of the resin material is formed as a part of the resin material part 33 on the inner diameter side of the rotor 19 so that the strength of the rotor 19 can be enhanced. Since the resin material is a material having high magnetic permeability, it does not affect the motor characteristics, even if there is the resin material part 33 on the inner diameter side of the rotor 19. Also, even when the rotor 19 and the stator 18 come into contact with each other, damage can be reduced because of smoothness of the resin material part 33. Although it is necessary to axially fix the magnets 32 also in the motor generator 3 of the IPM type, formation of the resin material part 33 extending to the end face of the rotor 19 or adjustment of the dimensions of the magnet holes and the magnets 32 in the rotor 19 allows the resin material part 33 to surround the magnets 32 to fix the magnets 32.

A preferred method for manufacturing the rotor 19 includes insert molding of the resin material. This makes it possible to obtain a precise shape in fewer steps. The magnets 32 can be produced from unmagnetized magnetic bodies by magnetizing them after the insert molding, while preventing attachment of the magnets 32 to, e.g., a mold, and thus it is not necessary to consider demagnetization of the magnets due to heat during injection molding. Where the motor generator 3 is of the IPM type, it is easy to insert the magnetic bodies to be formed into the magnets 32 by magnetization into the magnet holes in the rotor 19 and perform injection molding. In this way, the magnets 32 can be produced so as to have a uniform magnetization direction.

As a material for the resin material part 33, resin materials commonly used in injection molding can be used. Glass fibers or carbon fiber materials etc. may also be used as a reinforcing material for the resin. Forms of such a reinforcing material may include fibers, beads, and whiskers.

The rotor 19 may be integrally molded with the inner ring 5 of the wheel bearing 2 during insert molding. This makes it possible to form the rotor 19 fixed with the inner ring 5 of the wheel bearing 2.

Figure 9:
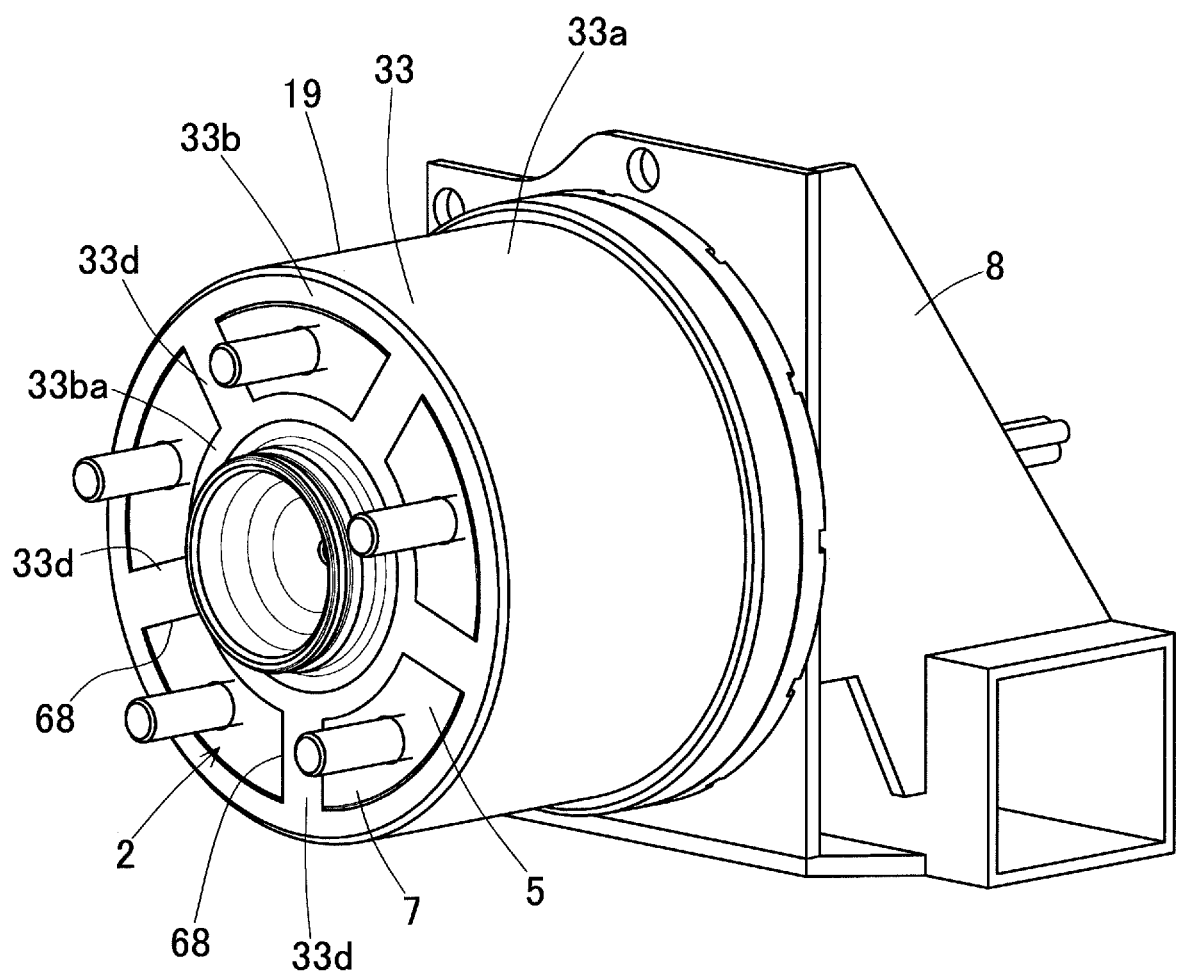
FIG. 9 is a perspective view illustrating a mount state of a vehicle power device according to another embodiment to a chassis frame component.

As shown in FIG. 9, a groove 68 may be defined in the hub flange 7 of the inner ring 5 of the wheel bearing 2 so as to introduce the resin for the resin material part 33 of the rotor 19 thereto to form a radial rib part 33d. The rib 33d extends from the cylindrical part 33a of the resin material part 33 to the thick portion 33ba at the inner peripheral edge of the bottom part 33b. By forming the rib part 33d this way, the rotor 19 can be securely fixed to the inner ring 5.

Although the resin is molded in the groove 68 defined in a side surface of the hub flange 7 in the example of FIG. 9, the groove 68 for introducing the resin may extend in the circumferential direction so as to introduce the resin to the side surface of the hub flange 7 on the inboard side.

The rotor 19 having any of the above-described configurations may also be separately produced from the inner ring 5 of the wheel bearing 2, and the rotor 19 having the form of a bottomed casing may be fitted to the inner ring 5 of the wheel bearing 2. Whereas insert molding requires a mold to be placed around the wheel bearing 2, this makes it possible to easily obtain a similar form.

Control System of Vehicle 30

Figure 10:
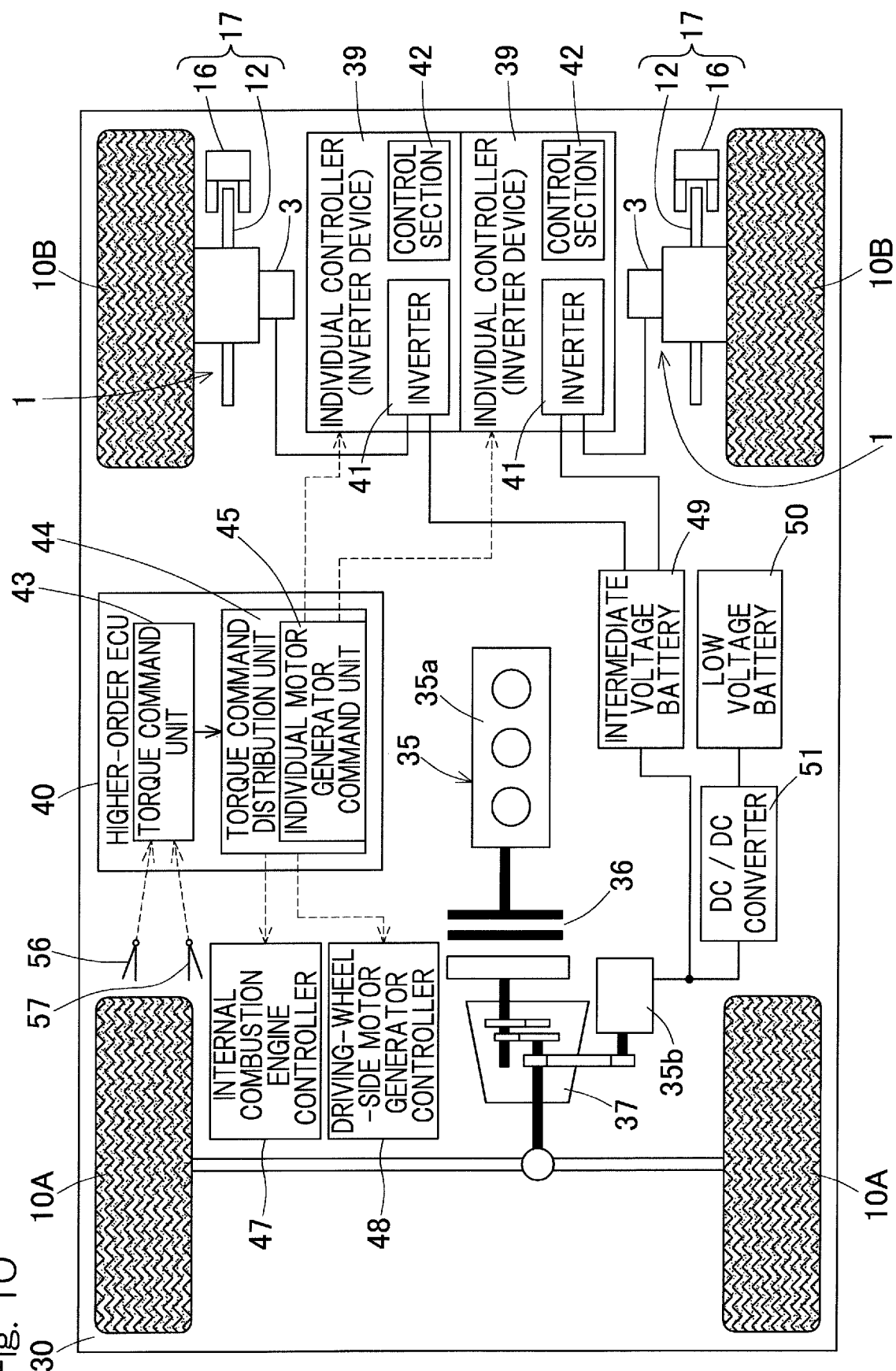
FIG. 10 illustrates a conceptual configuration of a drive system and a control system of a vehicle equipped with the vehicle power device.

In FIG. 10, a higher order ECU 40 is a unit for performing integrated control of the vehicle 30 and includes a torque command generation unit 43. The torque command generation unit 43 generates a torque command in accordance with a signal of an operation amount that is input from each of an accelerator operation unit 56, such as an accelerator pedal, as well as a brake operation unit 57, such as a brake pedal. The vehicle 30 includes an internal combustion engine 35a as a main driving source 35, a driving-wheel-side motor generator 35b, and motor generators 3, 3 because the vehicle power devices 1 are provided to two driven wheels 10B, 10B. Accordingly, the higher order ECU 40 is provided with a torque command distribution unit 44 for distributing the torque command(s) to the respective driving sources 35a, 35b, 3, 3 in accordance with a predetermined rule.

A torque command to the internal combustion engine 35a is transmitted to an internal combustion engine controller 47 and is used for, e.g., control of a valve operation degree by the internal combustion engine controller 47. A torque command to the driving-wheel-side motor generator 35b is transmitted to and executed on a driving-wheel-side motor generator controller 48. Torque commands to the generators 3, 3 on the driven wheel side are transmitted to individual controllers 39, 39. The section of the torque command distribution unit 44 which performs output to the individual controllers 39, 39 is referred to as an individual motor generator command unit 45. The individual motor generator command unit 45 also has a function of providing each individual controller 39 with a torque command that is a command of a distributed braking force to be produced by each motor generator 3 by regenerative braking in response to a signal of an operation amount from the brake operation unit 57.

Each of the individual controllers 39 is an inverter device and includes: an inverter 41 for converting direct current from an intermediate voltage battery 49 into a three-phrase alternating current voltage; and a control section 42 for controlling an output of the inverter 41 in accordance with, e.g., the torque command, by, e.g., PWM control. The inverter 41 includes: a bridge circuit (not illustrated) in the form of, e.g., a semi-conductor switching element; and a charge circuit (not illustrated) for charging the intermediate voltage battery 49 with regenerative power from the generators 3. It should be noted that although each of the individual controllers 39 is separately provided to each of the two motor generators 3, 3, the two individual controllers 39, 39 may be disposed in a single enclosure and share the control section 42 in common.

Figure 11:
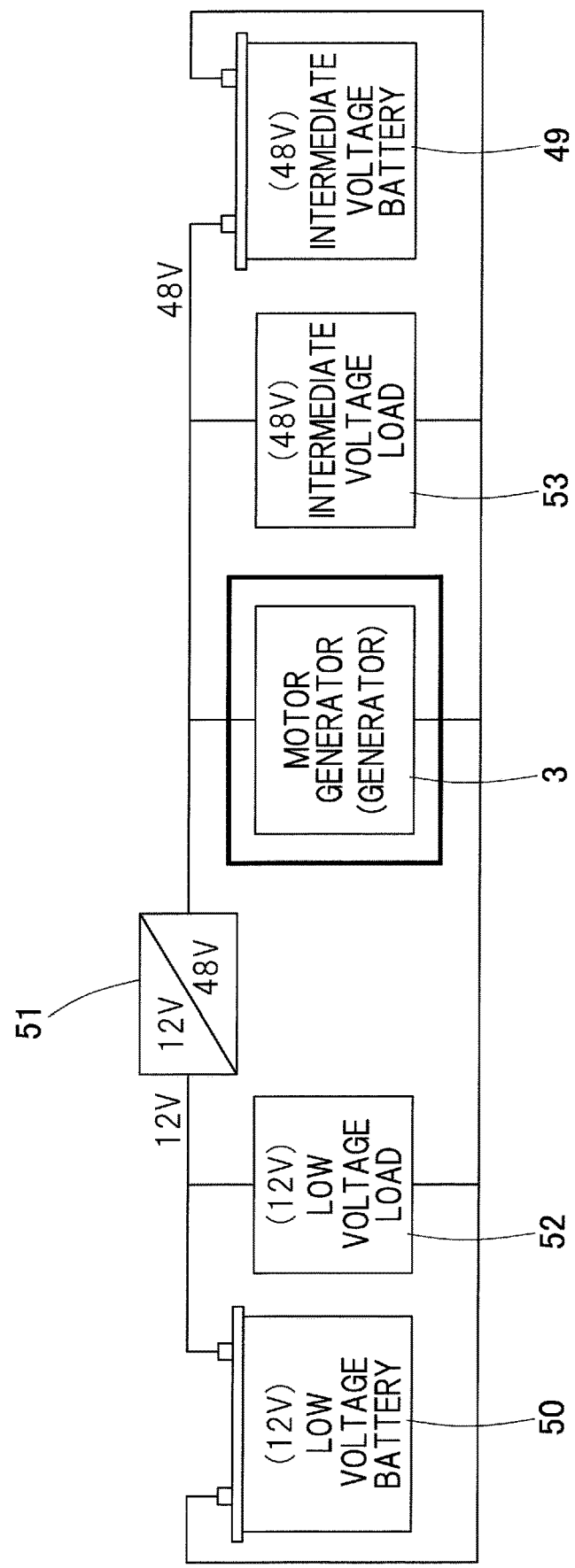
FIG. 11 is a power system diagram of an example of the vehicle.
Figure 12:
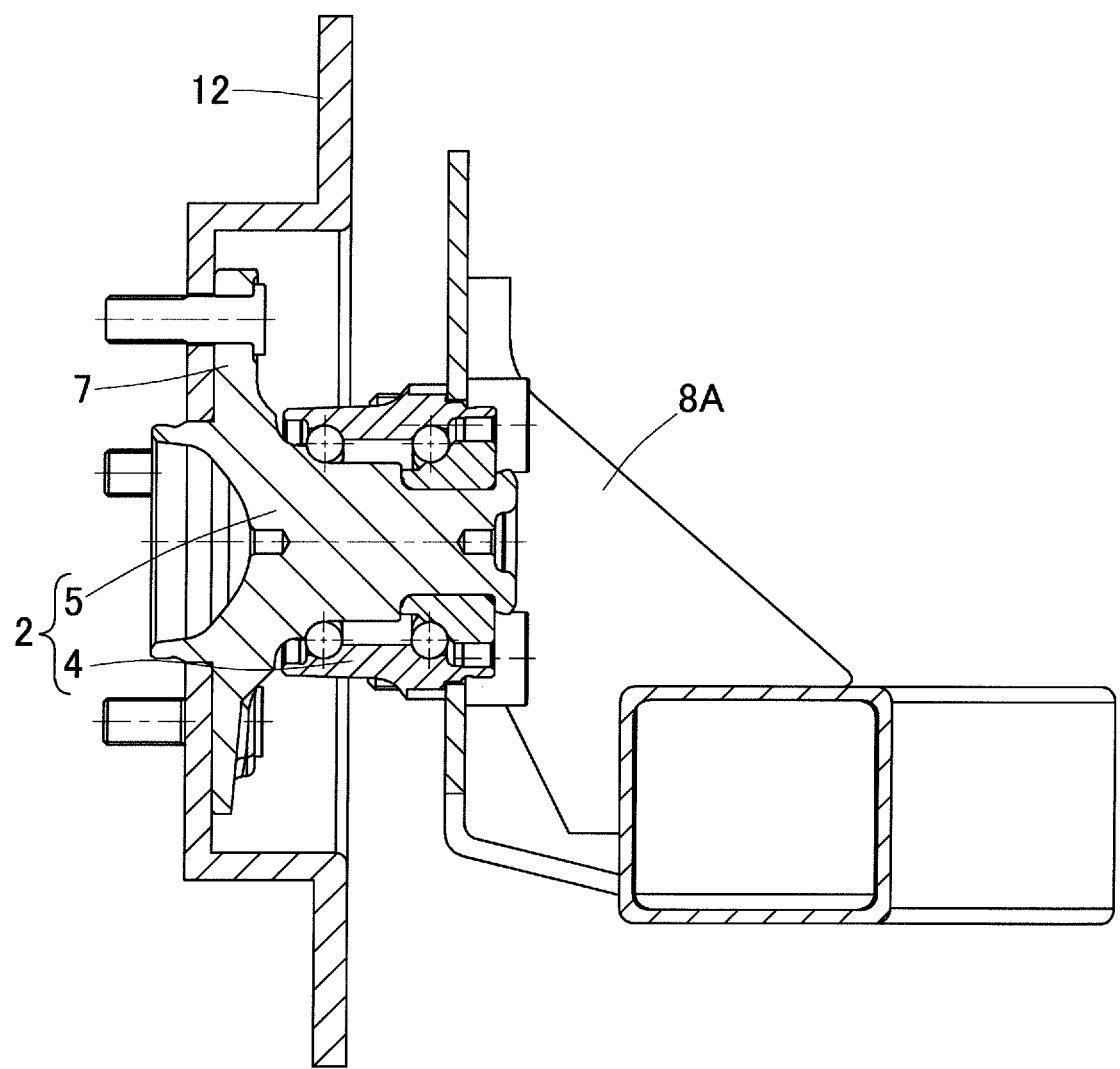
FIG. 12 is a sectional view of a conventional wheel bearing device.
Figure 13:
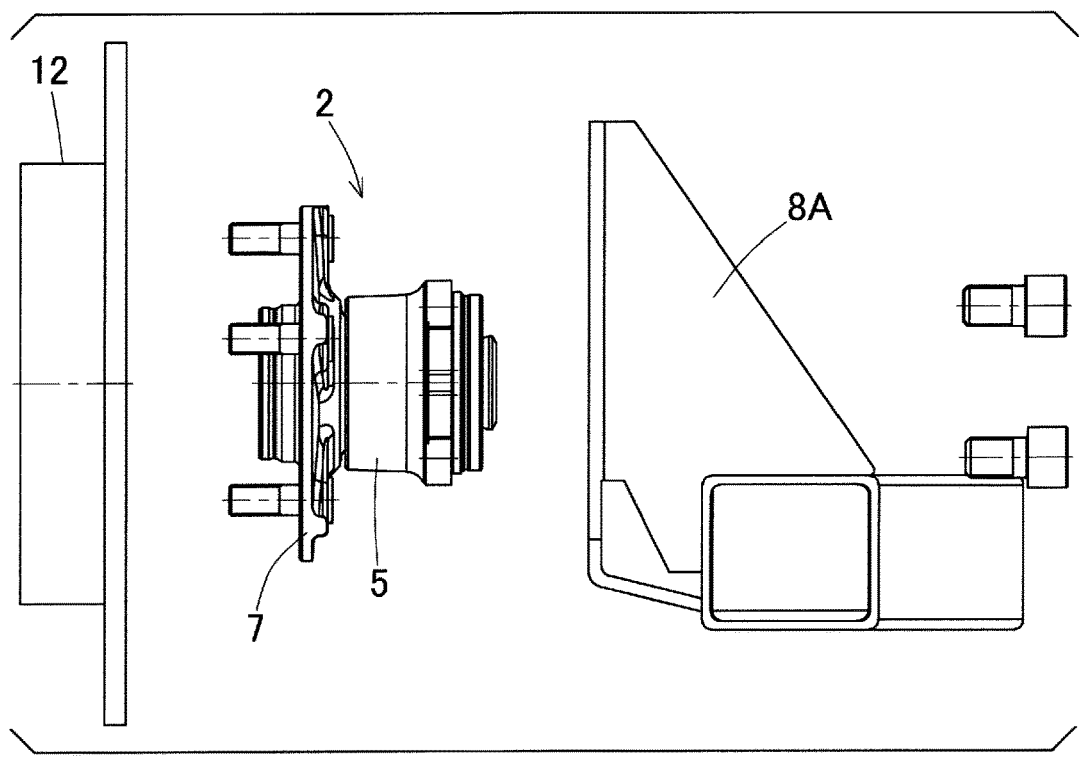
FIG. 13 is a side view of the wheel bearing, a brake rotor, and a knuckle in a mutually exploded state.
Figure 14:
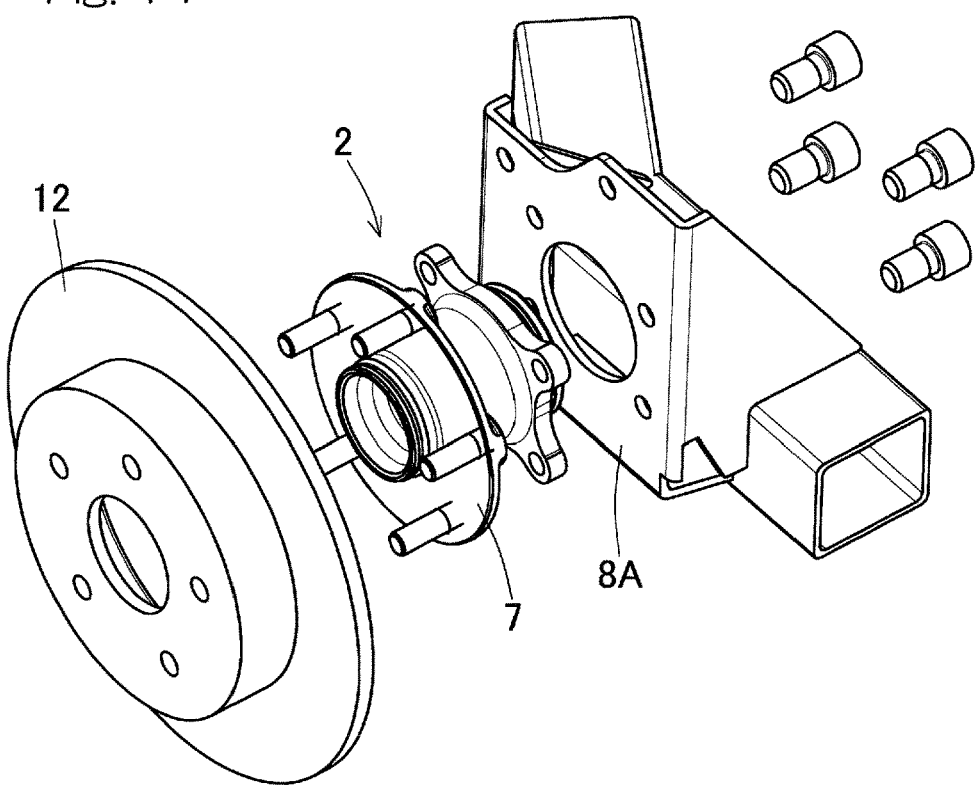
FIG. 14 is a perspective view of the wheel bearing, the brake rotor, and the knuckle in a mutually exploded state.

FIG. 11 is a power system diagram of an exemplary vehicle equipped with a vehicle system shown in FIG. 10. In the example of FIG. 11, there are a low voltage battery 50 and an intermediate voltage battery 49 as batteries, and the intermediate voltage battery 49 and the low voltage battery 50 are connected via a DC/DC convertor 51. There are two motor generators 3, but only one of them is illustrated as a representative. Although the driving-wheel-side motor generator 35b in FIG. 10 is not illustrated in FIG. 11, it is connected to the intermediate voltage system in parallel with the motor generator 3 on the driven wheel side. The low voltage system is connected with a low voltage load 52, and the intermediate voltage system is connected with an intermediate voltage load 53. There are a plurality of the low voltage loads 52 and a plurality of the intermediate voltage loads 53, but only one for each load is illustrated as a representative.

The low voltage battery 50 is a battery that is commonly used for various automobiles as a power source for, e.g., a control system, and may be, for example, 12 V or 24 V. The low voltage load 52 may include a starter motor of the internal combustion engine 35*a*, lights, and key components, such as the higher order ECU 40 and other ECU (not illustrated). The low voltage battery 50 may be called as an auxiliary battery for electric accessories, and the intermediate voltage battery 49 may be called as an auxiliary battery for an electric system.

The intermediate voltage battery 49 has a voltage higher than that of the low voltage battery 50 but lower than that of a high voltage battery (100 V or higher, for example, about 200 to 400 V) used in, e.g., strong hybrid vehicles, the voltage having a negligible influence to a human body when an electric shock occurs during operation. For example, it is preferable to use a 48-V battery that has been employed for mild hybrids in recent years. The intermediate voltage battery 49, such as a 48-V battery, can be relatively easily installed in a vehicle equipped with a conventional internal combustion engine, and such a vehicle can be converted to a mild hybrid so as to reduce fuel consumption by power assist and/or regeneration by electric power.

The intermediate voltage loads 53 of the 48-V system are the accessory components, including the power-assisted motor that is the driving-wheel-side motor generator 35*b*, an electric pump, an electric power steering, a supercharger, and an air compressor. Since the loads from the accessories are set up as the 48-V system, the system can reduce the possibility of an electric shock to a passenger or a maintenance operator, though the system can provide a lower output by power assist than that of a high voltage system (such as a strong hybrid vehicle with a voltage of 100 V or higher). The system also allows an insulation coating of a wire to be thin, making it possible to reduce the weight and/or volume of the wires. In addition, the system can input/output a larger electric power with a smaller amount of current than that of a 12-V system, making it possible to reduce the volume of the electric motor or the generator. Thus, the system contributes to the effect of reducing fuel consumption in the vehicle.

This vehicle system is suitable for accessory components of such a mild-hybrid vehicle and is applied as a power-assist and power-regenerative component. It should be noted that although conventionally, a mild-hybrid vehicle sometimes includes a CMG, a GMG, or a belt-drive starter motor (none of them are illustrated), all of these are affected by efficiency of a transmission device and a speed reduction gear because they perform power assist or regeneration for an internal engine or a power device.

In contrast, since the vehicle system of this example is mounted on the driven wheel 10B, the vehicle system is separated from the main driving source, such as the internal combustion engine 35*a* and the electric motor (not illustrated), and can directly use kinetic energy of the vehicle body 1 in power regeneration. In cases where a CMG, a GMG, or a belt-drive starter motor is provided, its incorporation has to be taken into consideration from a designing phase of the vehicle 30, and thus it is difficult to retrofit these components. In contrast, the motor generator 3 of this vehicle system, which can be accommodated within the driven wheel 10B, can be attached even to a finished vehicle in a number of steps equivalent to that of component replacement, making it possible to set up a 48-V system even to a finished vehicle having an internal combustion engine 35*a* only. A vehicle having the vehicle system of this embodiment may be provided with a different motor generator 35*b* for auxiliary driving, as in the example shown in FIG. 10. In such a case, an amount of power assist or an amount of regenerative power to the vehicle 30 can be increased, contributing to further reduction in fuel consumption.

Although the vehicle system shown in FIG. 10 has a function of generating power, it may be a system that does not perform rotation drive when supplied with power. In such a case, a braking force can be generated by storing regenerative power generated by a dedicated generator, instead of the motor generators 3, in the intermediate voltage battery 49. Appropriate use of such a system in combination with or alternative to the mechanical brake operation unit 57 makes it possible to improve braking performance. Thus, when limited to the function of generating power, each individual controller 39 may be in the form of an AC/DC converter device (not illustrated), instead of an inverter device. The AC/DC converter device has a function of converting three-phase alternating current voltage to direct current voltage to charge the intermediate voltage battery 49 with the regenerative power from the generator 3 and can be controlled more easily than an inverter, making it possible to have a compact configuration.

It should be noted that although, in the above embodiments, the motor generator 3 as a whole has a smaller diameter than that of the outer peripheral part 12*b* of the brake rotor 12, and the entirety of the motor generator 3, excluding its mounting part to the hub flange 7, is located within the axial range between the hub flange 7 and the vehicle body attachment surface of the wheel bearing 2 on the inboard side, it is only necessary that all or a part of the stator 12 and the motor rotor 19 is located within a space defined by the disk part 12*a* and the cylindrical part 12*b* of the brake rotor 12. The space defined by the disk part 12*a* and the cylindrical part 12*b* of the brake rotor 12 is a cylindrical space having: an outer diameter smaller than that of the cylindrical part 12*b* of the brake rotor 12; an axial range over the extension of the cylindrical part 12*b*; and an inner diameter equal to or larger than the minimum diameter of the disk part 12*a*. Where only a part of the stator 18 and the rotor 19 is located within this space, the rest of the stator 18 and the rotor 19 is, for example, located within an axial range on the hub flange 7 side with respect to the wheel bearing attachment surface of the chassis frame component 8. This invention can also be applied where the wheel bearing 2 is of an outer ring rotation type.

In addition, although the power device 1 for vehicles in the present application has a third generation structure in which the wheel bearing 2 includes the hub axle fitted with the single partial inner ring as the rotary ring and is constituted as an assembly of the outer ring as a stationary ring, the hub axle and the partial inner ring, the configuration of the power device is not limited to this. A structure body combinedly including a hub having a hub flange and a member having raceway surfaces for rolling elements corresponds to a rotary ring in this specification. The wheel bearing 2 may have, for example, a first generation structure mainly including an outer ring as a stationary ring and an inner ring fitted to an outer peripheral surface of a hub having a hub flange or a second generation structure of an inner ring rotation type including an outer ring as a stationary ring and an inner ring fitted to an outer peripheral surface of a hub having a hub flange. In these examples, a combined body of the hub and the inner ring corresponds to a "rotary ring" in this specification. The wheel bearing 2 may have a second generation structure of an outer ring rotation type including an outer ring as a rotary ring having a hub flange and an inner ring as a stationary ring.

Although the present invention has been described in terms of the embodiments thereof for carrying out the invention, the embodiments disclosed herein are merely examples in all respects, and are not to be taken as limiting the scope of the present invention in any way whatsoever. The scope of the present invention is to be determined by the appended claims, not by the above description, and is intended to include any change made within the scope of claims or equivalent thereto.

REFERENCE NUMERALS

1 . . . Power device for vehicle
2 . . . Wheel bearing
3 . . . Motor generator (Generator)
4 . . . Outer ring (Stationary ring)
5 . . . Inner ring (rotary ring)
7 . . . Hub flange
8 . . . Knuckle (Chassis frame component)
12 . . . Brake rotor
18 . . . Stator
19 . . . Rotor
31 . . . Soft magnetic body part
32 . . . Magnet
33 . . . Resin material part

What is claimed is:

1. A power device for a vehicle comprising:
a wheel bearing including a stationary ring and a rotary ring having a hub flange, the rotary ring being rotatably supported by the stationary ring via rolling elements, the hub flange being configured to be attached with a wheel of the vehicle and a brake rotor; and
a generator including a stator attached to the stationary ring of the wheel bearing and a rotor attached to the rotary ring of the wheel bearing,
wherein the rotor includes a soft magnetic material part, magnets, and a resin material part that is integrally molded with the soft magnetic material part and the magnets, and
the brake rotor is attached to the hub flange through the resin material part, and the brake rotor includes a plate-like part and an outer peripheral part extending from the plate-like part toward an outer peripheral side of an outer ring;
the resin material part of the rotor forms a case of the generator;
a bottom part of the resin material part is overlapped with the plate-like part of the brake rotor; and
the plate-like part of the brake rotor is attached to the hub flange through the bottom part of the resin material part.

2. The power device for a vehicle as claimed in claim 1, wherein the generator is a motor generator configured to be supplied with power to generate a rotational driving force.

3. The power device for a vehicle as claimed in claim 1, wherein the generator is of an outer rotor type in which the stator is located on an outer periphery of the wheel bearing, and the rotor is located on an outer periphery side of the stator.

4. The power device for a vehicle as claimed in claim 1, wherein the generator is of a surface permanent magnet type in which the magnets are arranged on a surface of the soft magnetic material part of the rotor.

5. The power device for a vehicle as claimed in claim 1, wherein the generator is of an interior permanent magnet type in which the magnets are arranged in the soft magnetic material part of the rotor.

6. The power device for a vehicle as claimed in claim 1, wherein an inner ring of the wheel bearing and the rotor are integrally molded with a resin material forming the resin material part.

7. The power device for a vehicle as claimed in claim 1, wherein the generator has a power generation voltage lower than 60 V.

8. A vehicle comprising the power device as claimed in claim 1.

* * * * *